United States Patent
Lewis et al.

(10) Patent No.: US 10,645,054 B1
(45) Date of Patent: *May 5, 2020

(54) PROMOTING SOCIAL NETWORK SHARING OF A CONTENT ITEM ON A CONTENT SHARING PLATFORM

(71) Applicant: Google LLC, Mountain View, CA (US)

(72) Inventors: Justin Lewis, Marina del Rey, CA (US); Gavin James, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/139,297

(22) Filed: Sep. 24, 2018

Related U.S. Application Data

(63) Continuation of application No. 15/467,170, filed on Mar. 23, 2017, now Pat. No. 10,084,744, which is a
(Continued)

(51) Int. Cl.
*H04L 29/08* (2006.01)
*H04L 12/58* (2006.01)
(Continued)

(52) U.S. Cl.
CPC ............ *H04L 51/32* (2013.01); *G06F 3/0483* (2013.01); *H04L 51/10* (2013.01); *H04L 67/22* (2013.01);
(Continued)

(58) Field of Classification Search
CPC ......... H04L 51/32; H04L 51/10; H04L 67/24; H04L 67/22; H04N 21/4788;
(Continued)

(56) References Cited

U.S. PATENT DOCUMENTS

2005/0025465 A1* 2/2005 Danieli ................ H04N 5/9201
386/243
2011/0289161 A1* 11/2011 Rankin, Jr. .......... G06Q 10/107
709/206

(Continued)

OTHER PUBLICATIONS

U.S. Appl. No. 61/834,950, filed Jun. 2013, Evans, Gary.*
(Continued)

*Primary Examiner* — Soe Hlaing
(74) *Attorney, Agent, or Firm* — Lowenstein Sandler LLP

(57) ABSTRACT

A method for promoting social network sharing of a content item is disclosed. The method includes providing, by a processing device of a content sharing platform based on actions of a user, a user interface (UI) component to the user to share a content item of the content sharing platform on social networks, wherein the UI component to be provided in a UI presenting the content item and allowing the user to share the content item on the social networks, identifying, based on actions of the user, presentation characteristics to present the UI component to the user, wherein the presentation characteristics comprise a location of the UI component in the UI, and selecting, based on a history of the user with each of the social networks, one or more of the social networks to include in the UI component, wherein the selecting is initiated without input from the user.

20 Claims, 9 Drawing Sheets

Related U.S. Application Data continuation of application No. 14/036,686, filed on Sep. 25, 2013, now Pat. No. 9,628,575.

(51) Int. Cl.
*H04N 21/4788* (2011.01)
*G06F 3/0483* (2013.01)
*H04N 21/81* (2011.01)

(52) U.S. Cl.
CPC ......... *H04L 67/24* (2013.01); *H04N 21/4788* (2013.01); *H04N 21/812* (2013.01)

(58) Field of Classification Search
CPC ............. H04N 21/812; H04N 21/4316; H04N 21/4826; G06F 3/0483
See application file for complete search history.

(56) References Cited

U.S. PATENT DOCUMENTS

| | | | |
|---|---|---|---|
| 2012/0030586 A1* | 2/2012 | Ketkar | G06Q 30/0269 715/751 |
| 2012/0311465 A1 | 12/2012 | Nealer et al. | |
| 2012/0311509 A1 | 12/2012 | Maggiotto et al. | |
| 2013/0268973 A1* | 10/2013 | Archibong | G06Q 50/01 725/51 |
| 2014/0067828 A1* | 3/2014 | Archibong | H04L 65/4084 707/748 |
| 2014/0149510 A1* | 5/2014 | Sundaresan | H04L 65/403 709/204 |

OTHER PUBLICATIONS

USPTO, Office Action for U.S. Appl. No. 14/036,686, dated Jun. 11, 2015.
USPTO, Final Office Action for U.S. Appl. No. 14/036,686, dated Dec. 17, 2015.
USPTO, Office Action for U.S. Appl. No. 14/036,686, dated Mar. 14, 2016.
USPTO, Notice of Allowance for U.S. Appl. No. 14/036,686, dated Dec. 7, 2016.
USPTO, Notice of Allowance for U.S. Appl. No. 15/467,170, dated May 17, 2018.

* cited by examiner

400

Receive indication that the user is to be shown a sharing promotion with respect to viewing of a content item of the content sharing platform
410

Calculate placement score for the user/content item pair based on signals related to share promotion history of the user, referral history of the user, and the promotion score of the user
420

Identify sharing promotion placement option having a placement score range that the calculated placement score falls
430

Select a number of SNs for the identified sharing promotion placement option from the top scoring SNs of the social network scores of the user/content item pair
440

Generate sharing promotion in accordance with the identified sharing promotion placement option and selected SNs for the user/content item pair
450

Provide generated sharing promotion for inclusion in a GUI of the content sharing platform associated with the viewing of the content item by the user
460

FIG. 4

PROMOTING SOCIAL NETWORK SHARING OF A CONTENT ITEM ON A CONTENT SHARING PLATFORM

RELATED APPLICATIONS

This application is a continuation of U.S. patent application Ser. No. 15/467,170, filed on Mar. 23, 2017, which is a continuation of U.S. patent application Ser. No. 14/036,686, filed on Sep. 25, 2013 and issued as U.S. Pat. No. 9,628,575 on Apr. 18, 2017, where the entire contents of each application are incorporated by reference herein.

TECHNICAL FIELD

This disclosure relates to the field of content sharing platforms and, in particular, to promoting social network sharing of a content item on a content sharing platform.

BACKGROUND

On the Internet, social networks allow users to connect to and share information with each other. Many social networks include a content sharing aspect that allows users to upload, view, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos.

Currently, users are spending increased amounts of time on content sharing platforms. "Sharing" of content items between users of the content sharing platform and with users of other social networks is important for driving views of content items of the content sharing platform, starting viewing sessions on the content sharing platform, and increasing watch time of content items on the content sharing platform. Sharing refers to a user of the content sharing platform promoting and/or endorsing a content item to another user of the content sharing platform or of another social network for viewing purposes. As such, many content sharing platforms promote sharing as a feature when viewing a content item. This sharing feature is generally a static function of a user interface (UI) displaying the content item for viewing by users. For example, the sharing function may be a tab or icon located in a set place on the UI, without regard to how the content item was accessed or the viewing and/or sharing history of the user.

However, in some cases, when a user of a content sharing platform interacts with a sharing function of a content sharing platform, there is a negative impact on overall watch time of that user at the content sharing platform. This is because the sharing function distracts the user from the content item and from continuing his or her watch session at the content sharing platform.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for promoting social network sharing of a content item on a content sharing platform is disclosed. The method includes determining whether actions of a user and statistics associated with a content item of the content sharing platform satisfy criteria to present a promotion to the user to share the content item on one or more social networks. The method further includes identifying, based on the actions and the statistics, presentation characteristics to present the promotion to the user to share the content item. The method also includes selecting, based on a history of the user with each of the one or more social networks, at least one of the one or more social networks to include in the promotion for the user to select from for sharing the content item. In some implementations, the content item is a video.

In one implementation, the actions of the user comprise at least one of whether the user arrived at the content item from one of the one or more social networks, whether the user shared other content items on the content sharing platform, whether the user has generated referrals from the one or more other social networks, whether the user has been presented other promotions on the content sharing platform and a frequency and recency of the other promotions to the user, whether the user uploaded the content item to the content sharing platform, an affinity score of the user with a channel of the content item, or predicted user actions with respect to the content item. In addition, the statistics associated with the content item comprise at least one of a number of times the content item is shared, a click-to-return rate of a share button for the content item, a number of referrers for the content item, an identity of the one or more social networks the content item is referred from, a recency of upload of the content item to the content sharing platform, a number of views of the content item, whether the user has shared the content item previously, or a frequency of views of the content item by the user.

Furthermore, in some implementations, the selecting at least one of the one or more social networks is based on which of the social networks the user arrived at the UI of the content item from, which social networks the user has shared to previously, which social networks has the user generated attributed refers from previously, which social networks are preferred based on a geo-location of an Internet Protocol (IP) of the user, or a logged-in status of the user with the social networks.

In a further implementation, the presentation characteristics of the promotion comprise a location within a user interface (UI) presenting the content item to the user. Furthermore, the location may include at least one of a pop-up window within a player of the content item, a banner above the player of the content item, a tab displaying the promotion below the player of the content item that is shown by default when the user views the UI associated with the content item, or a highlight window pointing to the tab displaying the promotion. In addition, the presentation characteristics of the promotion may comprise displaying the pop-up window when the user pauses viewing of the content item. Furthermore, the presentation characteristics of the promotion may comprise displaying the pop-up window when the user finishes viewing of the content item.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

FIG. 4 is a flow diagram illustrating another method for promoting social network sharing of a content item on a content sharing platform, according to some implementations of the disclosure.

DETAILED DESCRIPTION

Implementations are described for promoting social network sharing of a content item on a content sharing platform. In implementations of the disclosure, a promotion to share a content item being viewed by a user is tailored based on a history of the user and the content item. A sharing promotion refers to a user interface (UI) component that can allow the user to share the content item (e.g., a content item hyperlink) with his or her social connections on one or more social networks. The content sharing platform can determine when and how to promote sharing of the content item to the user, with different promotion options and social network options for sharing based on past activities of the user, including past shares and referrals and also the previous interactions of the user with the content item.

Implementations of the disclosure have a different layer of granularity than previous solutions for promoting a content item. Previously, content sharing platforms provided a static sharing feature for a user to interact with for purposes of sharing a content item. This static sharing feature was usually the same for all users of the content sharing platform and persistent in terms of appearance and location within the UIs of the content sharing platforms. By implementing methods promoting social network sharing of a content item on a content sharing platform according to the present disclosure, the promotion of sharing of content items is more responsive to individual user/content item circumstances, and can also provide for increased watch time and increased sharing of content items between social networks, thus driving additional watch time to the content sharing platform.

Figure 1:
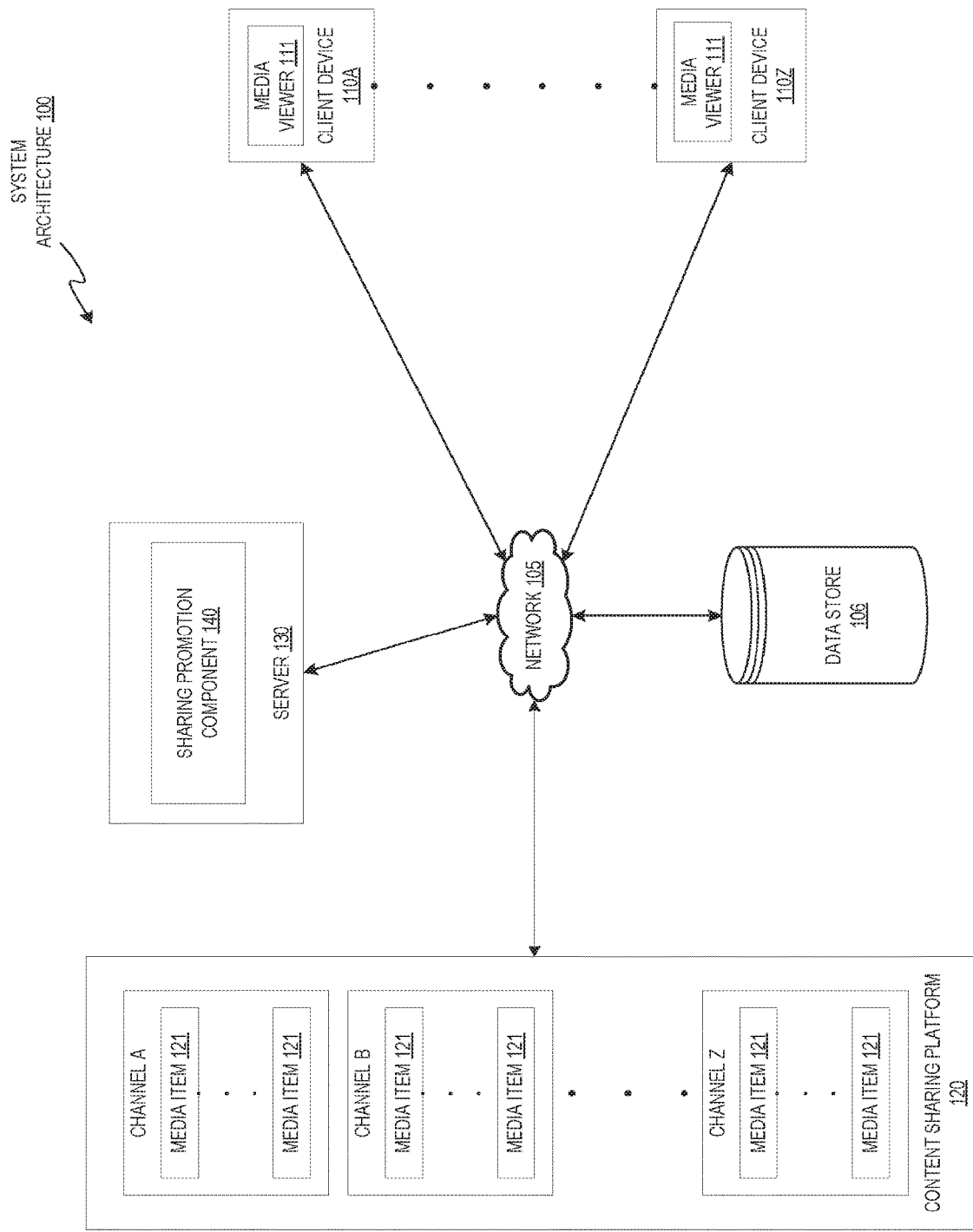
FIG. 1 illustrates an example system architecture, in accordance with one implementation of the disclosure.

FIG. 1 illustrates an example system architecture 100, in accordance with one implementation of the disclosure, for navigation of a list of content sharing platform media items on a client device via gesture controls and contextual synchronization. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a media item.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a sharing promotion component 140. In one implementation, the sharing promotion component 140 determines when and how to promote sharing of a content item to a user of the content sharing platform 120. In one implementation, the promotion provided to a user is a UI component that allows the user to share the content item (e.g., a content item hyperlink) with his or her social connections on one or more social networks (which may include the content sharing platform 120 as well as other external social networks to the content sharing platform). The determination of when and how to promote sharing by implementations of the disclosure are specific to the user viewing the content item and to the content item being viewed by the user. Further description of the sharing promotion component 140 and its specific functions is described in more detail below with respect to FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
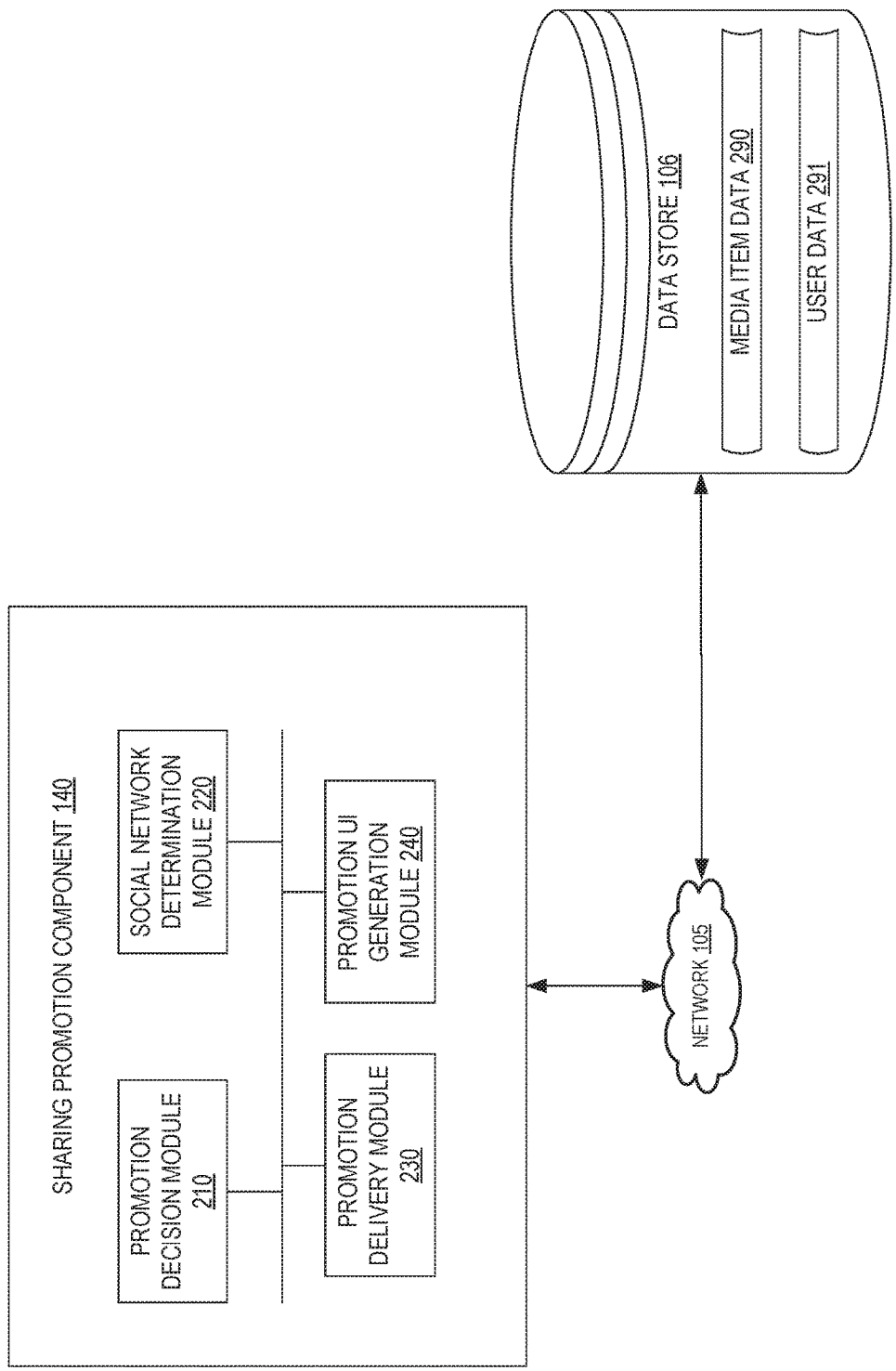
FIG. 2 is a block diagram illustrating a sharing promotion component in accordance with one implementation of the disclosure.

FIG. 2 is a block diagram illustrating a sharing promotion component 140 in accordance with one implementation of the disclosure. In one implementation, the sharing promotion component 140 includes a promotion decision module 210, a social network determination module 220, a promotion delivery module 230, and a promotion user interface (UI) generation module 240. More or less components may be included in the sharing promotion component 140 without loss of generality. For example, two of the modules may be combined into a single module, or one of the modules may be divided into two or more modules. In one implementation, one or more of the modules may reside on different computing devices (e.g., different server computers).

The sharing promotion component 140 is communicatively coupled to the data store 106. For example, the sharing promotion component 140 may be coupled to the data store 106 via a network (e.g., via network 105 as illustrated in FIG. 1). In another example, the sharing promotion component 140 may be coupled directly to a server where the sharing promotion component 140 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes media item data 290, user data 291, and promotion history data 292.

As discussed above, the sharing promotion component 140 determines when and how to promote sharing of a content item to a user of the content sharing platform. Determining when and how to promote sharing of a content item may include, first determining if the user is to be shown a promotion to share the content item, then, if the user is to be shown a promotion, determining how the promotion is to be shown to the user in relation to the viewing of the content item, and lastly, determining which social network to promote the sharing for in the promotion.

In one implementation, when a user accesses and watches a content item from the content sharing platform, the promotion decision module 210 determines whether a user is to be shown a promotion to share the content item on one or more social networks (SNs) by calculating a score for the user based on one or more attributes ("signals"). If the calculated score exceeds a predetermined promotion threshold, then the user is shown the promotion to share the content item as part of the content item viewing experience.

The calculated score may be based on a variety of signals associated with the user and/or the content item being viewed. The media item data 290 and user data 291 from data store 106 may be accessed to obtain the desired signal data. The media item data 290 and user data 291 may be logs, or data based on logs, of the content sharing platform that identify a history of past referrals and results from the those referrals, including SNs used for referrals, for a user and for content items of the content sharing platform. Various functions may be utilized to generate the score, and implementations of the disclosure may implement any number of different functions to calculate the score.

In one implementation, the signals per user utilized by the promotion decision module 210 for the score calculation may include:

Referring Source: SN (i.e., referrer) from which the user arrived at the content sharing platform to originate the session at the content sharing platform.

Share User Actions: Did the user select any sharing button before (e.g., in the past N days)?

Referrer Attribution: Has the user generated attributed-referrers (e.g., user is credited for causing another user to navigate to the content sharing platform via a sharing promotion) before? If so, then more refers (e.g., other user traffic to the content sharing platform credited to the user) results in a greater contribution to score.

User Promotion History: Has the user been shown a share promotion recently and, if so, the number of recent share promotions shown?

Upload: Did the user upload this content item?

Channel Affinity: What is the user/channel (associated with the content item) affinity score (e.g., indication of relation between a user and a channel, such as how often a user visits the channel, how often user views content from the channel, etc.)?

Predicted User Action: Does user behavior indicate that the user is likely to quit viewing the content item? If so, then increase score so that the user is shown a promotion at the moment he or she is leaving.

In another implementation, the signals per content item utilized by the promotion decision module 210 for the score calculation may include:

Number of times that the content item is shared and/or a click-through rate (CTR) (e.g., number of times the content item is selected for viewing from a promotion divided by the total impressions (the number of times the promotion was served)) of the share button for that content item.

Number of referrers (e.g., users that have previously shared the content item with other users via a promotion) for the content item.

SNs the content item is referred from.

Recency (e.g., in terms of time since upload) of the content item.

Number of views on the content item.

Has the user shared this content item yet? If so, then reduce score.

Watch history—e.g., is this the second (or more) view by this user of this content item?

The social network determination module 220 may then calculate the score for the user per each SN sharing option. If the user scores above a threshold for any SN, then the promotion may be personalized for the user to share to the one or more SN(s) that score the highest.

In one implementation, signals utilized by the social network determination module 220 for calculating a score for the user/content item pair for an individual SN may include:

Referrer: Which SNs has the user visited from previously? During this session and/or during previous sessions?

SN Sharing History: Which SNs has the user shared to before?

Referrer Attribution: What SNs has this user generated attributed-refers (e.g., user is credited for causing another user to navigate to the content sharing platform via a sharing promotion) from before?

Geographic location of Internet Provider (IP): Which SNs are preferred by Internet Provider?

SN user status: Logged in status of the user at the SN(s)?

Once the promotion decision module 210 and the social network determination module 220 have determined that the user is to receive a sharing promotion for a content item, then the promotion delivery module 230 utilizes the score and a separate (overlapping) set of factors to determine presentations characteristics for the promotion. In one implementation, the presentation characteristics include where within the graphical user interface (GUI) associated with the content item viewing that the sharing promotion is to be presented to the user. The sharing promotion may be located at, for example, one of a variety of positions in the GUI, such as within the media player screen showing the content item (at one or both of a pause screen (UI shown in media player when playback of the content item is paused) or the end cap (UI shown in media player when playback of the content item ends) of the playback of the content item), above the media player in the GUI, below the media player in the GUI as part of a pre-existing "share" tab of the GUI, as a pop-up banner in the GUI pointing to the pre-existing "share" tab that educates users about where to share, and so on. FIGS. 5-8 described further below provide examples of presentation characteristics (e.g., different locations within a content item GUI) that a sharing promotion may implement.

Some of the sharing promotion locations may cause more shares of a content item, but at the expense of watch time from the user. Other locations of the sharing promotion may cause more shares of the content item in the long run for users who do not normally share (e.g., the promotions that highlight where the share button is).

In some implementations, a separate set of factors may be used by the promotion delivery module 230 to determine where in the GUI to locate the sharing promotion:

Share promotion history: Has the user been shown a promotion in the current session? If so, what type of promotion and where was it located? Promotion should be selected that is different from previous promotion locations so that the user does not get used to the promotion and overlook it in the GUI.

How many referrers is this user likely to generate if he/she shares the content item? The higher the number of potential referrers skews the results toward more prominent promotion locations that might cause a larger negative effect to watch time.

Has the user shared before? If the user has not shared via the share menu of the content item GUI previously, then this skews towards promotions that show the user how to share.

Is the user likely to share the content item if shown a share promotion? If the user does not share regularly, or the promotions have a low CTR for this user, then this skews toward showing promotions in the pause screen and end cap, which cause the smallest impact on user watch time.

In one implementation, each placement option for a sharing promotion may be associated with a score range. As a result, the resulting placement score for the user correlates to a particular sharing promotion placement.

A number of SNs to include in a sharing promotion may vary from one SN to multiple SNs, depending on the particular promotion and/or configuration settings. In general, there may be a set list of SNs to which a user may share content items from the content sharing platform. Depending upon the type of promotion selected by the promotion delivery module 230 for the user/content item pair, a subset of the highest scoring SNs may be shown in the promotion. In some implementations, only those SNs having a score (in relation to the user/content item pair) greater than a predetermined SN score threshold are considered for inclusion in a sharing promotion to the user.

In some implementations, the promoting social network sharing of a content item on a content sharing platform described above is performed in the context of content item streaming to a mobile device that is executing a content sharing platform application specifically designed for playback of the content item.

Figure 3:
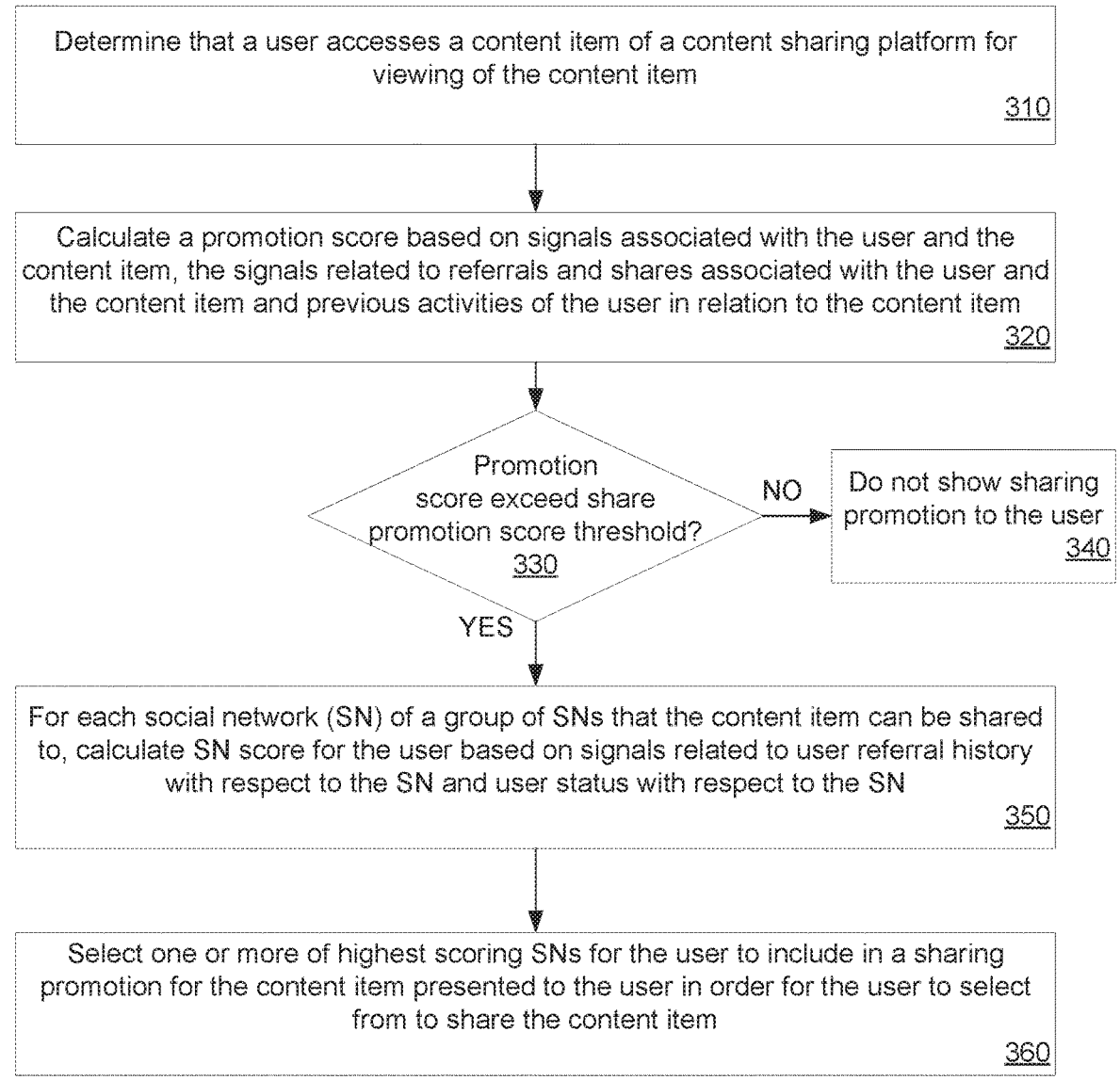
FIG. 3 is a flow diagram illustrating a method for promoting social network sharing of a content item on a content sharing platform, according to some implementations of the disclosure.

FIG. 3 is a flow diagram illustrating a method 300 for promoting social network sharing of a content item on a content sharing platform, according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by sharing promotion component 140, as shown in FIGS. 1 and 2.

Referring to FIG. 3, at block 310, method 300 begins at block 310 when the sharing promotion component determines that a user is accessing a content item of the content sharing platform to view the content item. At block 320, a promotion score is calculated for the user/content item pair based on signals associated with the user and the content item. For example, the signals may be related to referrals and shares associated with the user and the content item, as well as previous activities of the user in relation to the content item. As described above with respect to FIG. 2, a variety of signals may be utilized to calculate the promotion score.

At decision block 330, it is determined whether the calculated promotion score exceeds a share promotion score threshold. In one implementation, the share promotion score threshold is predetermined by an administrator of the content sharing platform. If the calculated promotion score does not exceed the threshold, the method 300 proceeds to block 340 where it is determined that a sharing promotion should not be shown to the user.

On the other hand, if the calculated promotion score does exceed the share promotion score threshold at decision block 330, then method 300 continues to block 350 where, for each SN of a group of SNs that the content item can be shared to, a SN score is calculated for the user. In one implementation, the SN score is based on signals related to a user referrer history with respect to the SN and user status with respect to the SN. As described above with respect to FIG. 2, a variety of signals may be utilized to calculate the SN score.

Lastly, at block 360, one or more of the highest SN scores for the user are selected to be included in a sharing promotion for the content item. The sharing promotion is to include the selected SNs in order for the user to select from those SNS to share the content item.

FIG. 4 is a flow diagram illustrating another method 400 for promoting social network sharing of a content item on a content sharing platform, according to an implementation of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by sharing promotion component 140, as shown in FIGS. 1 and 2.

Referring to FIG. 4, at block 410, method 400 begins at block 410 when an indication is received that the user is to be shown a sharing promotion with respect to viewing of a content item of the content sharing platform. In one implementation, the promotion decision module of the sharing promotion component may provide this indication. Then, at block 420, a placement score for the user/content item pair is calculated based on signals related to share promotion history of the user, referral history of the user, and the promotion score of the user (e.g., promotion score calculated in method 300 described with respect to FIG. 3).

At block 430, a sharing promotion placement option is identified that has a placement score range within which the calculated placement score falls. Sharing promotion placement options may include, but are not limited to a promotion placed within the media player screen showing the content item (at one or both of a pause screen of the playback of the content item or the end cap of the playback of the content item), a promotion placed above the media player in the GUI, a promotion placed below the media player in the GUI as part of a pre-existing "share" tab of the GUI, a promotion placed as a pop-up banner in the GUI pointing to a pre-existing "share" tab that educates users about where to share, and so on. In some implementations, each of multiple sharing promotion placement options may be associated with a score range of promotion scores. When a promotion score falls in the particular range of a sharing promotion placement options, that sharing promotion placement option is selected for the user/content item pair.

At block 440, a number of SNs are selected for the identified sharing promotion placement options. Each sharing promotion placement option may be configured to include a predetermined number of SNs to promote. These SNs are selected from the top scoring SNs of the SN scores calculated for the user/content item pair. For example, the SN score calculated in method 300 described with respect to FIG. 3 may be used to select the number of SNs to include in the sharing promotion placement option.

Subsequently, at block 450, a sharing promotion is generated in accordance with the identified sharing promotion placement option and the selected SNs for the user/content item pair. At block 460 the generated sharing promotion is provided for inclusion in a GUI of the content sharing platform associated with the viewing of the content item by the user.

Figure 5:
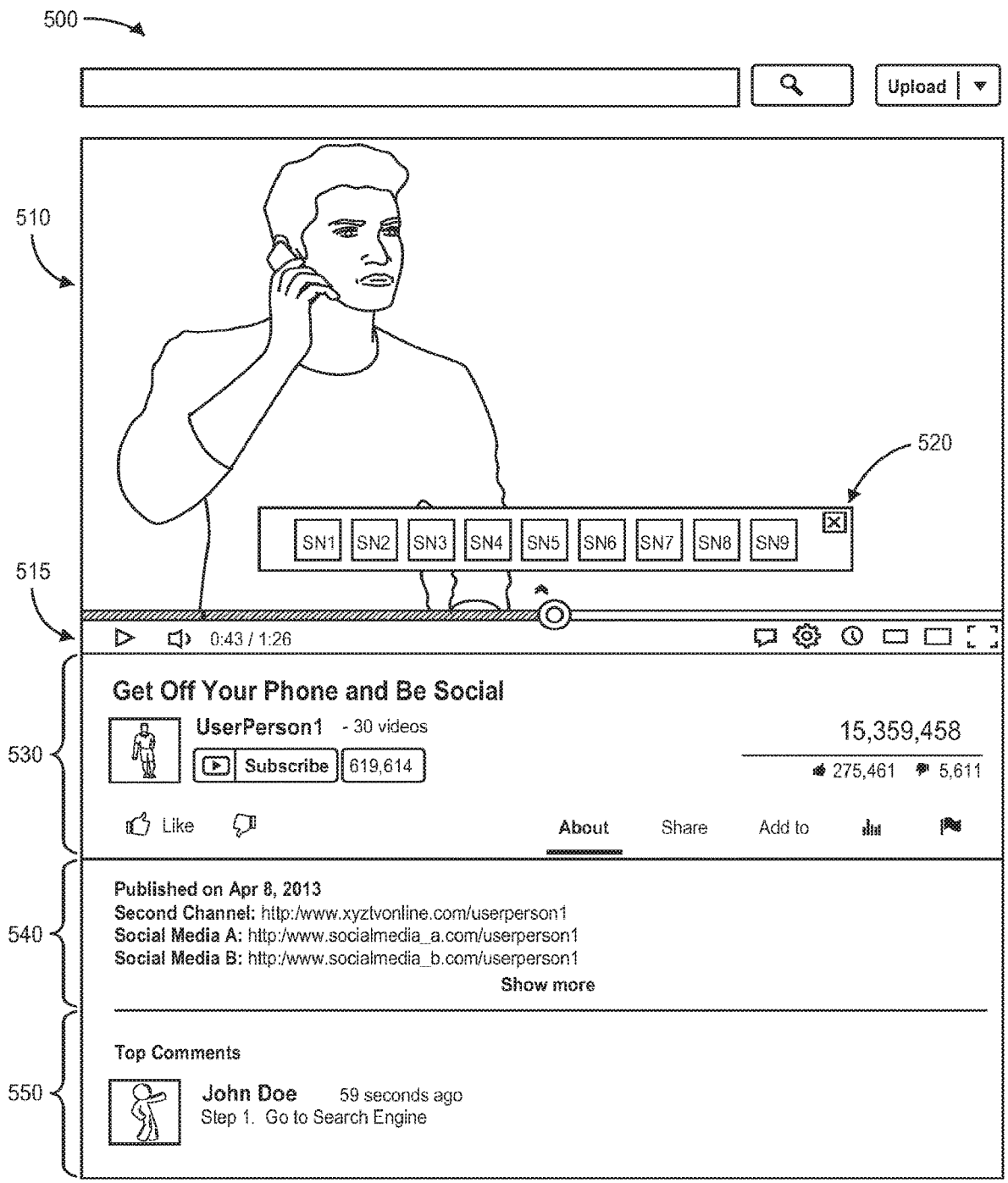
FIG. 5 is an example screenshot illustrating a sharing promotion UI provided to a user viewing a content item via a media player at a client device.

FIGS. 5 through 8 are example screenshots illustrating UIs for promoting social network sharing of a content item on a content sharing platform. FIG. 5 illustrates an example screenshot of a sharing promotion UI 500 provided to a user viewing a content item via a media player 510 at a client device. The sharing promotion UI 500 includes the media player 510 playing back the content item, a content item information section 530, an 'About' tab 540, and a comments section 550. The sharing promotion UI 500 also includes a sharing promotion overlay window 520 placed on top of the media player 510. In one implementation, the sharing promotion overlay window 520 is shown during a pause screen (e.g., when the scrub bar 515 is paused) of the content item. The scrub bar 515 is a UI component (e.g., bar) showing a timeline of the content item and a position of a user in the playback of the content item. In another implementation, the sharing promotion overlay window 520 is shown at an end cap of the content item (e.g., when the content item has finished play back in the media player 510. The sharing promotion overlay window 520 may include one or more SNs (e.g., SN1, SN2, SN3 . . . ) chosen according to the SN score selection described above.

Figure 6:
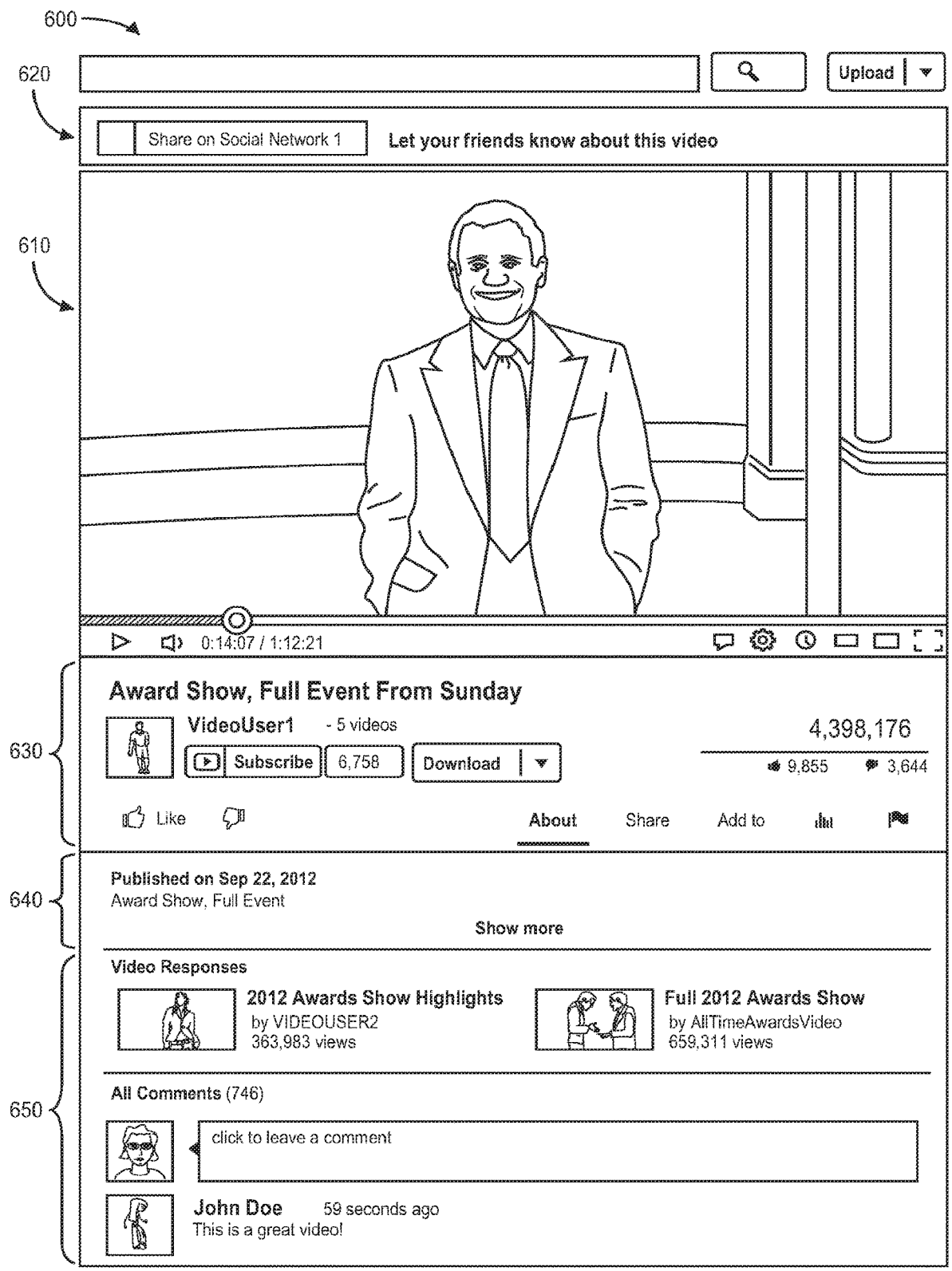
FIG. 6 is an example screenshot illustrating another sharing promotion UI provided to a user viewing a content item via a media player at a client device.

FIG. 6 illustrates an example screenshot of a sharing promotion UI 600 provided to a user viewing a content item via a media player 610 at a client device. The sharing promotion UI 600 includes the media player 610 playing back the content item, a content item information section 630, an 'About' tab 640, and a comments section 650. The sharing promotion UI 600 also includes a sharing promotion banner 620 shown above the media player 610. In one implementation, the sharing promotion banner 620 is shown during the entire playback of the content item. The sharing promotion banner 620 may include a highest scoring SN of the SN score computed for the user/content item pair. In other implementations, the sharing promotion banner 620 may include more than one SN of the highest scoring SNs for the user/content item pair. The sharing promotion banner 620 may also include text encouraging the user to share on the SN, as shown in sharing promotion UI 600.

Figure 7:
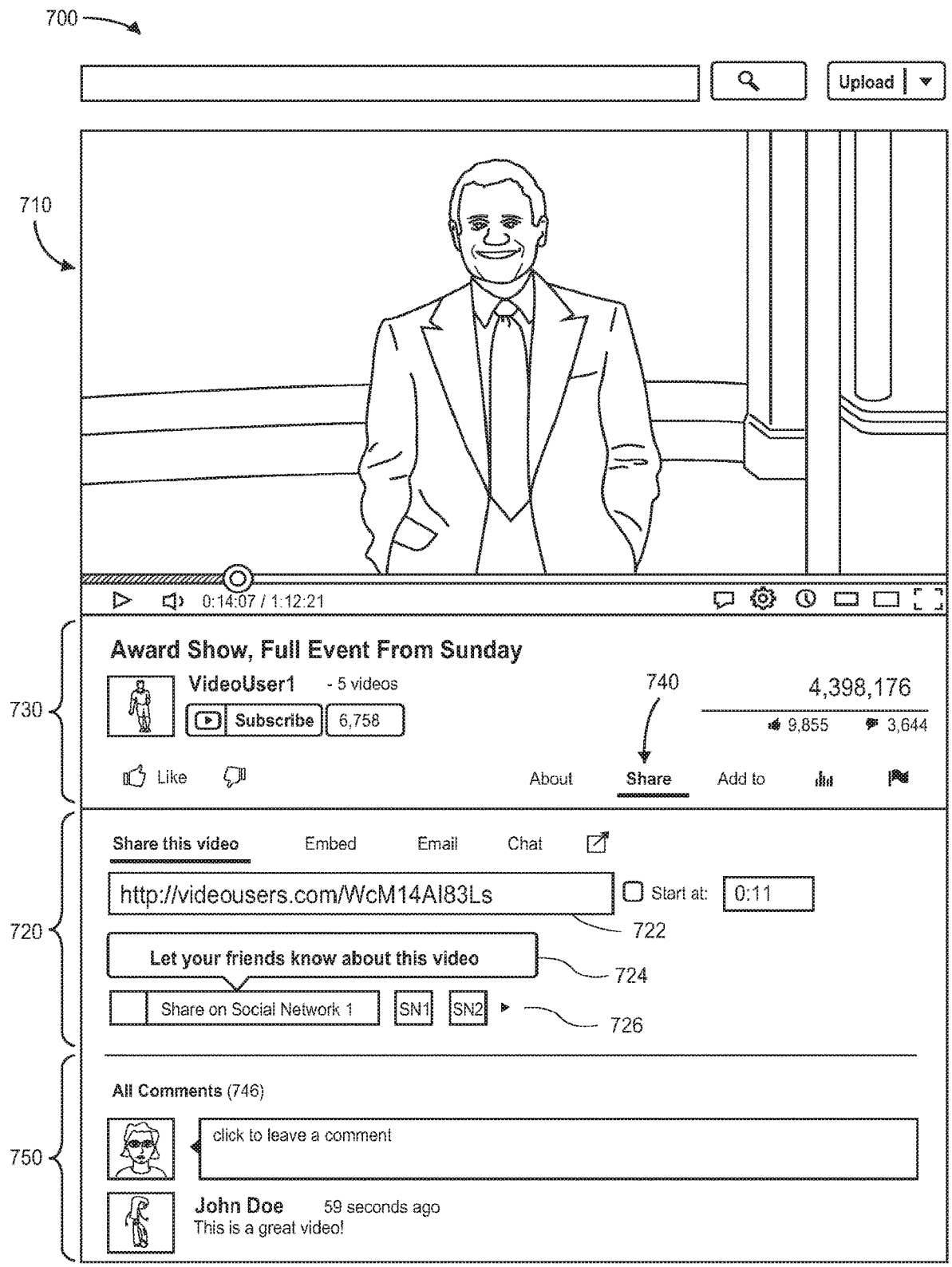
FIG. 7 is an example screenshot illustrating an additional sharing promotion UI provided to a user viewing a content item via a media player at a client device.

FIG. 7 illustrates an example screenshot of a sharing promotion UI 700 provided to a user viewing a content item via a media player 710 at a client device. The sharing promotion UI 700 includes the media player 710 playing back the content item, a content item information section 730, a 'Share' tab 740, and a comments section 750. The sharing promotion UI 700 also includes the 'share' tab 740 displaying enhanced sharing promotion information 720. In one implementation, the sharing tab 740 with enhanced sharing promotion information 720 is shown as the default tab during the entire playback of the content item. The sharing promotion information 720 may include a Uniform Resource Locator (URL) 722 of the content item to be shared, a pop-up instruction arrow 724 guising the user to select the share buttons 726 of one or more of the highest scoring SNs of the SN scores computed for the user/content item pair.

Figure 8:
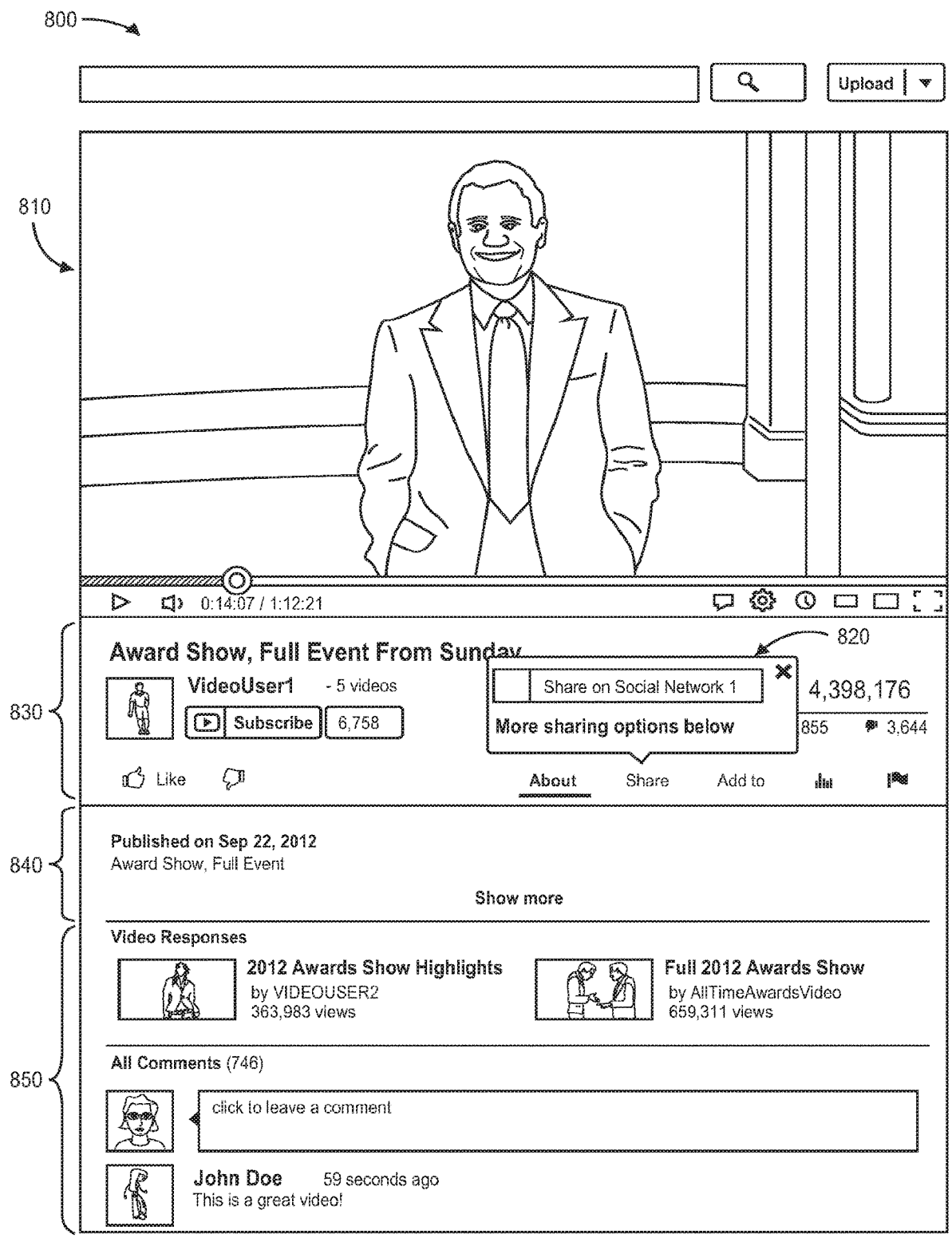
FIG. 8 is an example screenshot illustrating a further sharing promotion UI provided to a user viewing a content item via a media player at a client device.

FIG. 8 illustrates an example screenshot of a sharing promotion UI 800 provided to a user viewing a content item via a media player 810 at a client device. The sharing promotion UI 800 includes the media player 810 playing back the content item, a content item information section 830, an 'About' tab 840, and a comments section 850. The sharing promotion UI 800 also includes a sharing promotion pop-up window 820 pointing to a share tab of the UI 800, in order to direct and/or educate the user to select the share tab to display sharing options for the content item. The sharing promotion pop-up window 820 may be shown during the entire playback of the content item. In addition, the sharing promotion pop-up 820 may include a button to select a highest scoring SN of the SN score computed for the user/content item pair for sharing purposes. In other implementations, the sharing promotion pop-up window 820 may include more than one SN of the highest scoring SNs for the user/content item pair.

Figure 9:
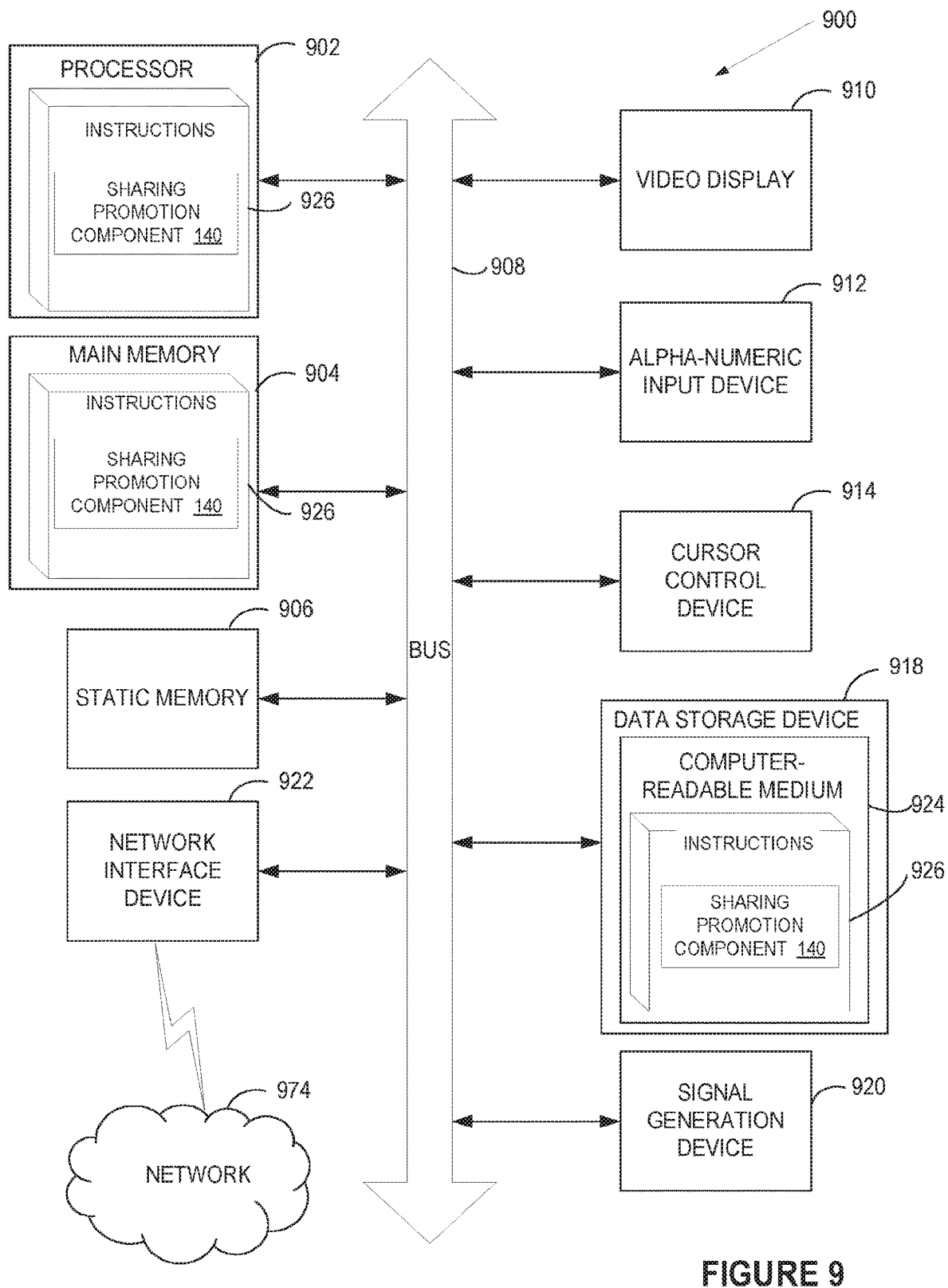
FIG. 9 is a block diagram illustrating an exemplary computer system, according to some implementations.

FIG. 9 illustrates a diagrammatic representation of a machine in the exemplary form of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (processor) 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 908.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute instructions 926 for performing the operations and steps discussed herein.

The computer system 900 may further include a network interface device 922. The computer system 900 also may include a video display unit 910 (e.g., a liquid crystal display (LCD), a cathode ray tube (CRT), or a touch screen), an alphanumeric input device 912 (e.g., a keyboard), a cursor control device 914 (e.g., a mouse), and a signal generation device 920 (e.g., a speaker).

The data storage device 918 may include a computer-readable storage medium 924 on which is stored one or more sets of instructions 926 (e.g., software) embodying any one or more of the methodologies or functions described herein. The instructions 926 may also reside, completely or at least partially, within the main memory 904 and/or within the processor 902 during execution thereof by the computer system 900, the main memory 904 and the processor 902 also constituting computer-readable storage media. The instructions 926 may further be transmitted or received over a network 974 via the network interface device 922.

In one embodiment, the instructions 926 include instructions for a sharing promotion component 140, which may correspond, respectively, to their identically-named counterparts described with respect to FIGS. 1 and 2, and/or a software library containing methods that call a sharing promotion component for promoting social network sharing of a content item on a content sharing platform. While the computer-readable storage medium 924 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   selecting, by a processing device of a content sharing platform based on a history of interactions of a user with each of a plurality of social networks, one or more social networks from the plurality of social networks; and providing, by the processing device of the content sharing platform based on actions of the user with respect to one or more content items of the content sharing platform, a user interface (UI) component to the user to share a content item of the content sharing platform on the one or more social networks, wherein the UI component to be provided in a UI presenting the content item based on presentation characteristics and allowing the user to share the content item on the one or more social networks, wherein the one or more social networks are included in the UI component, wherein the presentation characteristics to present the UI component to the user are identified based on the actions of the user with respect to the one or more content items of the content sharing platform, and wherein the presentation characteristics comprise a location of the UI component in the UI and a type of the UI component.

2. The method of claim 1, wherein the actions of the user with respect to the one or more content items of the content sharing platform comprise at least one of whether the user arrived at the content item from one of the one or more social networks, whether the user shared other content items on the content sharing platform, whether the user has generated referrals from the one or more social networks, whether the user has been presented other UI components to share content items on the content sharing platform and a frequency and recency of the other UI components to the user, whether the user uploaded the content item to the content sharing platform, an affinity score of the user with a channel of the content item, or predicted user actions with respect to the content item.

3. The method of claim 1, wherein the presentation characteristics are further based on statistics associated with the content item, the statistics comprising at least one of a number of times the content item is shared, a click-to-return rate of a share button for the content item, a number of referrers for the content item, an identity of the one or more social networks the content item is referred from, a recency of upload of the content item to the content sharing platform, a number of view of the content item, whether the user has shared the content item previously, or a frequency of view of the content item by the user.

4. The method of claim 1, wherein the selecting the one or more social networks is further based on which of the plurality of social networks the user arrived at the UI presenting the content item from, which of the plurality of social networks the user has shared to previously, which of the plurality of social networks has the user generated attributed refers from previously, which of the plurality of social networks are preferred based on a geo-location of an Internet Protocol (IP) of the user, or a logged-in status of the user with the plurality of social networks.

5. The method of claim 1, wherein providing the UI component based on the presentation characteristics comprises: providing as at least one of a pop-up window within a player of the content item, a banner above a player of the content item, a tab displaying the UI component below a player of the content item that is shown by default when the user view the UI presenting the content item, or a highlight window pointing to a tab displaying the UI component.

6. The method of claim 1, wherein the presentation characteristics further comprise a position of playback of the content item to trigger presentation of the UI component in the location, and wherein the position of the playback of the content item of the presentation characteristics of the UI component further comprises displaying a pop-up window when the playback of the content item is paused.

7. The method of claim 6, wherein the position of the playback of the content item of the presentation characteristics of the UI component comprises displaying the pop-up window when the playback of the content item completes.

8. The method of claim 1, wherein providing the UI component is further based on statistics associated with the content item of the content sharing platform, and wherein identifying the presentation characteristics is further based on the statistics associated with the content item.

9. The method of claim 1, wherein the history of interactions of the user comprises at least one of other content items shared by the user on the content sharing platform or referrals generated by the user from social networks.

10. A non-transitory machine-readable storage medium storing instructions which, when executed by a processing device of a content sharing platform, cause the processing device of the content sharing platform to perform operations comprising:

selecting, by the processing device of the content sharing platform based on a history of interactions of a user with each of a plurality of social networks, one or more social networks from the plurality of social networks; and providing, by the processing device of the content sharing platform based on actions of the user with respect to one or more content items of the content sharing platform, a user interface (UI) component to the user to share a content item of the content sharing platform on the one or more social networks, wherein the UI component to be provided in a UI presenting the content item based on presentation characteristics and allowing the user to share the content item on the one or more social networks, wherein the one or more social networks are included in the UI component, wherein the presentation characteristics to present the UI component to the user are identified based on the actions of the user with respect to the one or more content items of the content sharing platform, and wherein the presentation characteristics comprise a location of the UI component in the UI and a type of the UI component.

11. The non-transitory machine-readable storage medium of claim 10, wherein the actions of the user with respect to the one or more content items of the content sharing platform comprise at least one of whether the user arrived at the content item from one of the one or more social networks, whether the user shared other content items on the content sharing platform, whether the user has generated referrals from the one or more social networks, whether the user has been presented other UI components to share content items on the content sharing platform and a frequency and recency of the other UI components to the user, whether the user uploaded the content item to the content sharing platform, an affinity score of the user with a channel of the content item, or predicted user actions with respect to the content item.

12. The non-transitory machine-readable storage medium of claim 10, wherein the presentation characteristics are further based on statistics associated with the content item, the statistics comprising at least one of a number of times the content item is shared, a click-to-return rate of a share button for the content item, a number of referrers for the content item, an identity of the one or more social networks the content item is referred from, a recency of upload of the content item to the content sharing platform, a number of view of the content item, whether the user has shared the content item previously, or a frequency of view of the content item by the user.

13. The non-transitory machine-readable storage medium of claim 10, wherein the selecting at least one of the one or more social networks is further based on which of the plurality of social networks the user arrived at the UI of the content item from, which of the plurality of social networks the user has shared to previously, which of the plurality of social networks has the user generated attributed refers from previously, which of the plurality of social networks are preferred based on a geo-location of an Internet Protocol (IP) of the user, or a logged-in status of the user with the plurality of social networks.

14. The non-transitory machine-readable storage medium of claim 10, wherein providing the UI component based on the presentation characteristics comprises: providing as at least one of a pop-up window within a player of the content item, a banner above a player of the content item, a tab displaying the UI component below a player of the content item that is shown by default when the user view the UI presenting the content item, or a highlight window pointing to a tab displaying the UI component.

15. The non-transitory machine-readable storage medium of claim 10, wherein the presentation characteristics further comprise a position of playback of the content item to trigger presentation of the UI component in the location, and wherein the position of the playback of the content item of the presentation characteristics of the UI component further comprises displaying a pop-up window when at least one of the playback of the content item is paused or the playback of the content item is completed.

16. A user device comprising:
a display device to display a user interface (UI) for presenting a content items of a content sharing platform;
a memory; and
a processing device communicably coupled to the display device and the memory, the processing device to execute instructions to:
obtain data representing a UI component to share the content item of the content sharing platform on one or more social networks, the data being specific to the content item and a user viewing the content item; and
provide, based on the obtained data and based on actions of the user with respect to one or more content items of the content sharing platform, the UI component in the UI displayed by the display device, the UI component to allow the user to share the content item on the one or more social networks, wherein the one or more social networks are selected from a plurality of social networks, based on a history of interactions of the user with each of the plurality of social networks, for inclusion in the UI component, and wherein the UI component to be provided in the UI presenting the content item based on presentation characteristics, the presentation characteristics determined based on the actions of the user with respect to the one or more content items of the content sharing platform, the presentation characteristics comprising a location of the UI component within the UI and a type of the UI component.

17. The user device of claim 16, wherein the UI component is generated by the content sharing platform and sent to the user device in response to the actions of the user with respect to the one or more content items of the content sharing platform satisfying criteria to present the UI component to the user.

18. The user device of claim 16, wherein the actions of the user with respect to the one or more content items of the content sharing platform comprise at least one of whether the user arrived at the content item from one of the one or more social networks, whether the user shared other content items on the content sharing platform, whether the user has generated referrals from the one or more social networks, whether the user has been presented other UI components to share content items on the content sharing platform and a frequency and recency of the other UI components to the user, whether the user uploaded the content item to the content sharing platform, an affinity score of the user with a channel of the content item, or predicted user actions with respect to the content item.

19. The user device of claim 16, wherein providing the UI component is further based on statistics associated with the content item of the content sharing platform, and wherein the statistics associated with the content item comprise at least one of a number of times the content item is shared, a click-to-return rate of a share button for the content item, a number of referrers for the content item, an identity of the one or more social networks the content item is referred from, a recency of upload of the content item to the content sharing platform, a number of view of the content item, whether the user has shared the content item previously, or a frequency of view of the content item by the user.

20. The user device of claim 16, wherein the presentation characteristics further comprise a position of playback of the content item to trigger presentation of the UI component in the location within the UI, and wherein the position of the playback of the content item of the presentation characteristics of the UI component comprises displaying a pop-up window when at least one of the playback of the content item is paused or the playback of the content item is completed.

* * * * *